Patented Jan. 9, 1940

2,186,398

UNITED STATES PATENT OFFICE 2,186,398

PROCESS FOR REMOVING ACID COMPONENTS FROM HYDROCARBON DISTILLATES

David Louis Yabroff, Berkeley, Calif., assignor to Shell Development Company, San Francisco, Calif., a corporation of Delaware No Drawing. Application February 7, 1939, Serial No. 255,102

9 Claims. (Cl. 196—32)

This invention is a continuation-in-part of my co-pending applications Serial Nos. 102,892 and 102,893, filed September 28, 1936, and deals with the removal of weakly acid reacting organic substances from solutions in certain water-insoluble organic liquids by extraction with aqueous solutions of caustic alkali containing a solubility promoter for these substances, and more particularly deals with the removal of mercaptans from hydrocarbon distillates.

It is frequently necessary to eliminate small quantities of organic relatively weak acid reacting components such as mercaptans, phenols, thiophenols, alkyl phenols, fatty acids, etc., from their solutions in neutral or weakly basic reacting organic liquids which are substantially immiscible with water such as the liquid hydrocarbons derived from petroleum, benzene, toluene, xylene, substituted normally liquid hydrocarbons which are substantially insoluble in water, for instance, chlorinated hydrocarbons, of which chlorethane, ethylene dichloride, trichlorethylene, carbon tetrachloride, chlorpropane, chlorbutylene, chlorbenzene, brombenzene, are examples; or nitrogen containing hydrocarbons such as ampl or higher amines, aniline, water-insoluble pyridine derivatives, petroleum bases, etc.

In order that the water-insoluble organic liquids may be treated by my process, they must be substantially inert and resistant to chemical reaction with strong aqueous solutions of caustic alkali when contacted therewith for short periods of time, e.g., about 10 minutes or less at room temperatures.

My invention comprises extracting organic acids which are difficult to extract, such as the weak acids having dissociation constants lower than those of fatty acids, e.g., mercaptans, phenols, etc., contained in water-insoluble organic liquids which are substantially inert toward strong aqueous caustic alkali solutions at normal room temperature, with an aqueous solution of caustic alkali in which is dissolved a substantial amount of a solubility promoter for weak organic acids, under conditions to absorb at least a major portion of the weak organic acids in the aqueous solution, and to form two layers and separating the layers.

In the applications Serial Nos. 102,892 and 102,893, filed September 28, 1936, I have disclosed that certain polar substances which are at least partly miscible with aqueous solutions of strong caustic alkali, promote the solvent power for caustic alkali, promote the solvent power for weak organic acids of aqueous caustic alkali solutions in which they are dissolved. I have shown that among other compounds, certain glycols including diethylene glycol as well as certain diamines and amino alcohols are highly effective in the matter of promoting the solubility of weak organic acids such as mercaptans, phenols, etc., in aqueous caustic alkali solutions. I have discovered that of the many glycols, amino alcohols and diamines, those having the formula $X_1R_1YR_2X_2$ in which $X_1$ and $X_2$ are amino or hydroxy radicals, Y is an oxygen or sulfur atom and $R_1$ and $R_2$ are alkylene radicals having a total number of carbon atoms of 4 to 6. Typical examples of these compounds are the beta-beta' dihydroxy diethyl ether (diethylene glycol), beta hydroxy beta' amino diethyl ether, beta-beta' diamino diethyl ether; beta-beta' or beta-gamma or gamma-gamma' dihydroxy dipropyl ethers (dipropylene glycols) or analogous amino hydroxy or diamino compounds; thioethers analogous to the above ethers.

If the total number of carbon atoms in the alkaline radicals exceeds 6, the compounds are unsuited for my purpose, because they are insufficiently soluble in strong aqueous caustic alkali solutions and are excessively soluble in water-insoluble organic liquids.

Concentrations of the ethers in the aqueous solution should preferably be kept between the limits of about 25–75%, and the amount of water in the solution should be not less than 15% and not more than 70% and preferably not more than 50%. If less than 15% water is used, regeneration of the spent aqueous alkaline solution containing absorbed weak organic acids by steam stripping is very difficult, if not impossible. On the other hand, the presence of more than 15% water does not cause excessive hydrolysis with consequent reduction of extraction power for the weak organic acids, as had been believed by earlier investigators, hydrolysis being primarily a function of the alkalinity of the solution. Moreover, to minimize losses of the ethers due to their being dissolved in the organic water-insoluble liquid, it may be desirable to use 15% or more water. However, this last consideration is unimportant when treating hydrocarbon oils because the described ethers having 6 or less carbon atoms are substantially insoluble in hydrocarbon oils in the presence of amounts of water much smaller than 15%. For example, when treating isooctane with 20 volume percent of aqueous diethylene glycol containing 10 and 15% water, respectively, separating the liquids and analyzing the isooctane for diethylene glycols, no diethylene glycol was found dissolved in the isooctane in either case, the accuracy of the analytical procedure being such that less than .01% diethylene glycol would have been detected.

The effect of some of the compounds of my invention on the extraction efficiency of aqueous caustic alkali is illustrated by the following examples:

A solution of normal amyl mercaptan in gasoline was treated with aqueous solutions of sodium hydroxide containing various solubility promoters, and the distribution constants K for the mercaptan were determined, K being $$K = \frac{\text{concentration of mercaptan in aqueous phase}}{\text{concentration of mercaptan in oil phase}}$$

Results were as follows:

| Solubility promoter | Concentration of promoter | Normality of NaOH | K |
|---|---|---|---|
| | Percent | | |
| None | | 3.84 | 1.25 |
| None | | 5.0 | 1.03 |
| Diethylene glycol | 50 | 5.0 | 40 |
| Beta-beta' dihydroxy diethyl thioether | 50 | 5.0 | 20 |
| Beta-beta' diamino diethyl ether | 25 | 3.84 | 26 |
| Beta amino beta' hydroxy diethyl ether | 50 | 5.0 | 257 |
| Dipropylene glycol | 50 | 5.0 | 237 |

Aqueous solutions of various caustic alkalis may be used. The alkali metal hydroxides are most useful and effective, although ammonia, alkaline earth hydroxides, quaternary ammonium bases, alkali metal carbonates, etc., may also be suitable.

The concentration of the aqueous caustic alkali may vary within wide limits. In general, we prefer to use caustic alkali solutions which are above about 2 normal and preferably between 4 to 10 normal, calculated on the total solution, although higher and lower concentrations may be used.

The temperature of the extraction is preferably kept between 0° and 60° C., the extraction efficiency decreasing with increases in the temperature; and at temperatures below about 0° C. difficulties are frequently encountered due to precipitation of a portion of the solubility promoter and/or excessive viscosity of the aqueous caustic alkali containing the solubility promoter.

The extraction of the organic acids from their solutions in the organic liquids described before may be carried out by simply mixing the solution with a predetermined amount of the aqueous caustic alkali solution in which is dissolved a substantial amount of the solubility promoter, and then separating the liquids. The resulting aqueous solution contains most of the solubility promoter and the major portion of the organic acids, while the organic liquid stripped from the acids contains a trace of solubility promoter. By washing the stripped organic liquid with water, the solubility promoter is re-extracted by the latter. The aqueous solution so obtained may then be added to the caustic alkali solution containing the bulk of the solubility promoter and excess water may be separated from the resulting solution by distillation.

More thorough extraction may be had, however, in a multi-stage countercurrent extraction system or in a packed tower.

The amount of aqueous caustic alkali solution required in the extraction is normally above about 5% by volume and for economical reasons seldom exceeds about 100% by volume. Normally from about 10 to 50% by volume is used depending upon the required thoroughness of removing the weak organic acids.

Spent aqueous caustic alkali solution containing the solubility promoter and weak organic acids may be regenerated by distillation, steaming and/or oxidation, according to well-known principles.

The following example further illustrates my invention:

A West Texas straight run full range gasoline containing .0699% of mercaptan sulfur was extracted at 20° C. with 10 volume percent of a 5N aqueous caustic soda solution. 7% of the mercaptan sulfur was removed. The same gasoline was then treated under identical conditions with a 5N aqueous caustic soda solution containing 50% beta hydroxy beta' amino diethyl ether. 58.7% of the mercaptan sulfur was removed.

I claim as my invention:

1. In the process of separating organic acid reacting substances contained in a water-insoluble neutral or basic organic liquid, the steps comprising treating said liquid with an aqueous solution of a strong base containing a substantial amount of a dissolved compound having the formula $X_1R_1YR_2X_2$, in which $R_1$ and $R_2$ are alkylene radicals having a total number of carbon atoms from 4 to 6, $X_1$ and $X_2$ are radicals selected from the group consisting of amino and hydroxy radicals, and Y is an element selected from the group consisting of oxygen or sulfur, said solution containing from 15 to 70% water, under conditions to absorb at least a portion of said acid reacting substances in said aqueous solution and to form two liquid layers, one comprising the aqueous solution containing absorbed acid reacting substances, and the other consisting essentially of the treated organic liquid and separating the layers.

2. The process of claim 1 in which the aqueous base solution contains between 25 and 75% of the compound.

3. The process of claim 1 in which the aqueous base is from 2 to 10 normal.

4. The process of claim 1 in which the organic liquid is extracted with 5 to 100 volume percent of aqueous base solution containing the compound.

5. The process of claim 1 in which the base is an alkali metal hydroxide.

6. The process of claim 1 in which the compound is diethylene glycol.

7. The process of claim 1 in which the compound is dipropylene glycol.

8. The process of claim 1 in which the compound is beta amino beta' hydroxy diethyl ether.

9. In the process of separating mercaptans from hydrocarbon distillates containing same by extraction with an aqueous solution of a strong base, the improvement comprising extracting said distillate with at least 5 volume per cent of a 2 to 10 normal aqueous alkali metal hydroxide solution in which is dissolved between 25 and 75% of a dissolved compound having the formula $X_1R_1YR_2X_2$, in which $R_1$ and $R_2$ are alkylene radicals having a total number of carbon atoms from 4 to 6, $X_1$ and $X_2$ are radicals selected from the group consisting of amino and hydroxy radicals, and Y is an element selected from the group consisting of oxygen or sulfur, said solution containing from 15 to 70% water, under conditions to absorb at least a major portion of the mercaptans in the aqueous solution and to form two liquid layers, one comprising the aqueous alkali metal hydroxide solution containing substantially all of the compound and the major portion of the mercaptans, and the other consisting essentially of treated hydrocarbon distillate, and separating the layers.

DAVID LOUIS YABROFF.